Patented June 2, 1931

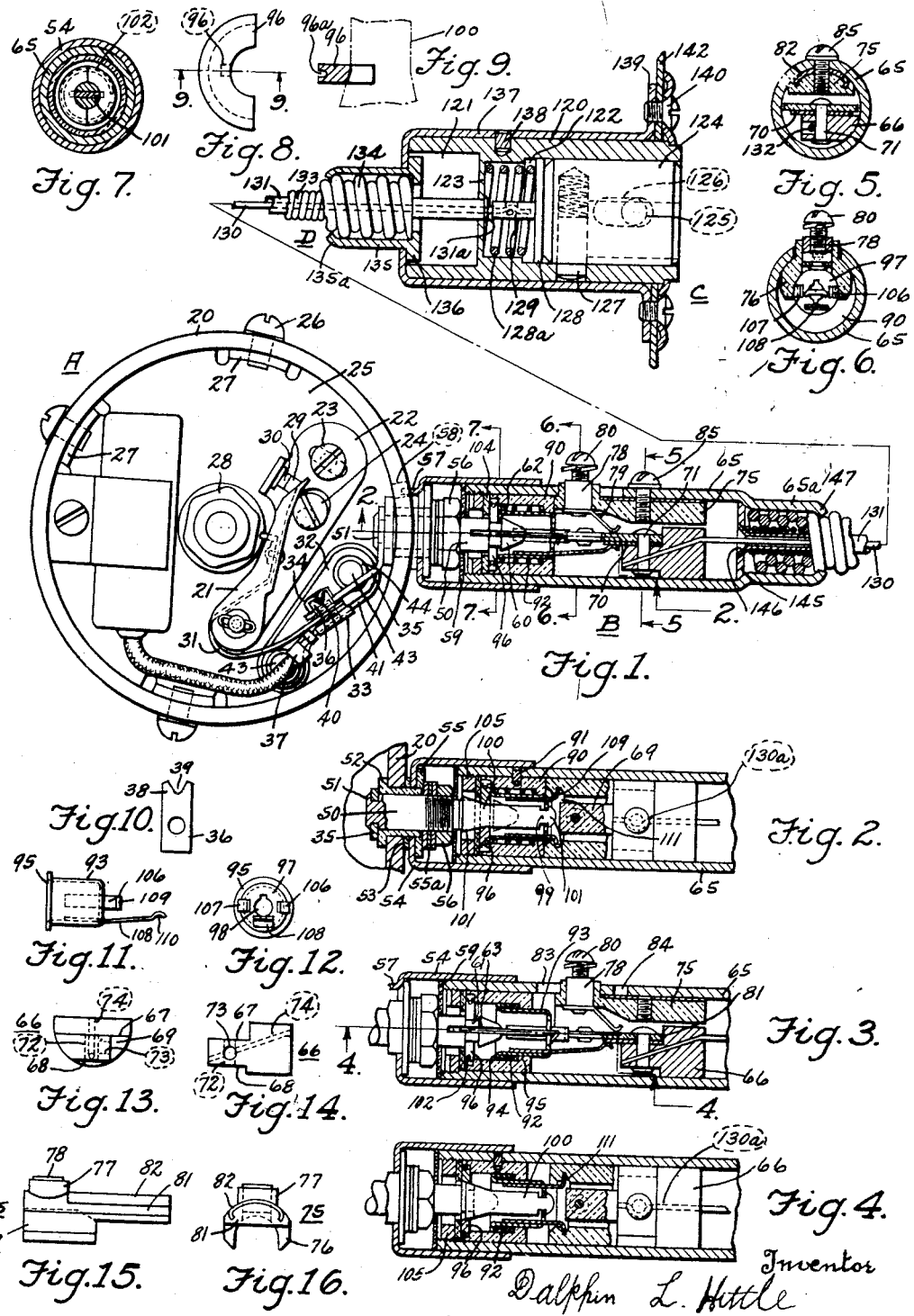

1,807,662

UNITED STATES PATENT OFFICE

DALPHIN L. HITTLE, OF ANDERSON, INDIANA, ASSIGNOR TO DELCO-REMY CORPORATION, OF ANDERSON, INDIANA, A CORPORATION OF DELAWARE

THEFT PREVENTIVE DEVICE

Application filed February 20, 1929. Serial No. 341,422.

The principal purpose of this invention is to provide an efficient and dependable theft protection for automobiles by making it practically a physical impossibility for anyone to switch off the ignition system in stopping the motor, without conditioning the apparatus in a non-operative relation to such an extent as to prevent reestablishment and use of the ignition system except by an authorized person, or one having the proper key.

This invention further relates to apparatus for preventing theft or unauthorized use of an automotive vehicle, and more particularly to a key controlled apparatus for preventing the functioning of an ignition element of the engine which propels the vehicle, and for preventing access to the ignition element in order to defeat the purpose of the theft preventing device.

One object of the present invention is to provide a structure comprising an electric switch and means for connecting one terminal of the switch with a piece of electrical apparatus, for example, an ignition element for an internal combustion engine, and to provide a key operated means for controlling the switch and for preventing removal of the switch case from the ignition element so that the purpose of the lock switch might not be defeated, the connecting means comprising an armored connector wire which is protected by a hard metal armor tube attached to the switch case and to the key operated means or controller unit.

A further object of the invention is to provide a switch in which one of the stationary contacts is movable under proper conditions to permit separation of an armored coupling, normally non-demountably connecting the switch mechanism with an ignition element or other electrical device.

Another object of the invention is to provide for coupling the armor with a piece of electrical apparatus such as an ignition timer or other ignition element, in such a manner that the armor cannot be disconnected from the apparatus without great difficulty and without consuming an amount of time as would arouse suspicion. In this connection, it is one of the objects of the invention to provide electrical connector contacts, one permanently attached to the apparatus and the other to the coupling, and to provide for causing these contacts to be engaged when the armor is attached to the electrical apparatus, and to prevent separation of the connection except upon proper manipulation of certain parts of the apparatus, which manipulation can be performed only after the parts have been conditioned therefor, by use of the proper key designed for the lock control device.

Another object of the invention is to provide means for coupling an ignition switch with an element of an ignition apparatus, and for locking the coupling and armor with the switch mechanism to the ignition element.

Another object of the invention is to prevent the theft or unauthorized use of an automobile by means of a key controlled switch and armored controller for connecting the switch with the ignition element, the switch having means for locking the ignition circuit in open condition, and for locking in closed circuit a ground connection with the ignition element so that when the ignition switch is locked in "off" position the ignition timer will be grounded.

A further object of the invention is to provide an electric switch and armored controller member having the features mentioned, said structure including an ignition element with which may be assembled the switch case, or which may be removed therefrom for replacement or repairs or for servicing of the parts, without the least destruction of the parts, but yet preventing unauthorized separation or tampering therewith which might defeat the purpose for which the structure is designed. In this connection, it is an object to hinder tampering with the electrical apparatus, and to complete a grounding connection for negativing operation of the switch, and to prevent separation of the switch structure from the ignition element to which it is attached while the device is locked in a circuit open condition.

Further objects and advantages of the present invention will be apparent from the following description, reference being had to the accompanying drawings wherein a preferred embodiment of one form of the present invention is clearly shown.

In the drawings:

Fig. 1 is a plan view of an element of ignition apparatus provided with my theft preventing device, certain parts of said device being shown in longitudinal section.

Fig. 2 is a section through the ignition lock switch and coupling unit embodying my invention, and is taken substantially along the line 2—2 of Fig. 1, and shows the parts locked in circuit open condition.

Fig. 3 is a section of the coupling unit similar to that shown in Fig. 1, but with certain parts thereof moved to a different position so as to permit separation of the coupling unit from the ignition element, and this view is taken substantially on the line 3—3 of Fig. 2.

Fig. 4 is a sectional view of my coupling unit similar to Fig. 2, but showing certain parts thereof moved so as to condition the coupling unit for removal from the ignition element.

Figs. 5, 6 and 7 are cross sectional views through my coupling unit as viewed substantially along the lines 5—5, 6—6 and 7—7 of Fig. 1.

Figs. 8 and 9 are elevational and sectional views respectively of the locking members or collars of the herein described coupling unit.

Fig. 10 is an elevation of a lock washer used in forming the non-demountable connection within a circuit breaker.

Figs. 11 and 12 are detailed views of the contact blade barrel forming a part of my coupling unit.

Figs. 13 and 14 are detailed views of a contact slide, and,

Figs. 15 and 16 are detailed views of a terminal support used in my coupling unit.

With particular reference to Fig. 1, my invention is illustrated as applied to an ignition element A as the circuit breaker of a timer mechanism and embodies a conditionally separable coupling unit B inclosing an ignition switch, having a remote controller unit C, operatively connected therewith by means of an armored connector D.

The ignition element A comprises a timer cup 20 provided with the usual circuit breaker lever 21 pivotally mounted upon an adjustable bracket 22, as by means of the screws 23 and 24 driven into the breaker plate 25. The plate 25 is secured to the cup 20, by means of the screws 26 threaded into the lugs 27 of the plate 25. 28 designates the usual cam cooperating with the rubbing block of the breaker lever 21, which functions to open and close the contacts 29 and 30 of the circuit breaker assembly.

The contact 29 is carried by one end of the lever 21 and is normally urged in engaging relation with the contact 30 by means of the contact spring 31 attached to the lever at one end, and fixedly supported at the other end on a contact bracket 32, by means of the ear 33 through which is threaded the cap screw or bolt 34, driven through the spring 31 and the ear or lug 33. The bolt 34 also acts to retain or secure to the lug 33, a connector element or link 35, being passed through an aperture in one end thereof, thence through a lock washer 36, through the contact spring 31, through the condenser terminal clip 37, and finally threaded through the ear or lug 33 of the contact bracket 32.

When these parts have been thus assembled and the bolt 34 has been screwed tight into the ear 33 to hold the elements just described in close engagement, the tangs 38 of the lock washer 36 are then bent down over the connector link 35 so that the tangs 38 lie in close engagement with the flat portions of the bolt 34, which will prevent it being readily turned or loosened by a wrench or other tool. The lock washer 36 is of special design as exhibited by Fig. 10, and is formed of hardened metal so that it cannot be easily bent with the aid of such tools as may usually be inserted within the space provided by the ignition element when the parts are in assembled relation. In the notch 39 between the bent over tangs as they lie against the head of the bolt 34, a drop of solder is placed as indicated at 40, so as to more securely connect the lock washer and the bolt and additionally protect the connection against separation.

The contact bracket 32 is insulatingly mounted upon the plate 25, by means of the insulating strip 41 inserted between the bracket and the plate, and the bracket, insulating strip and plate are secured together as by means of the rivets 43, passing therethrough and the insulating sleeves 44.

The hardened connector strap 35 has connection with a terminal or connector stud 50, which is insulatingly mounted in the wall of the ignition element A, and provides exterior thereof a terminal connection for the coupling unit B later to be described. Through the end of the strap 35, the reduced portion of the stud 50 is passed and riveted as at 51, to secure the two elements together and maintain a perfect electrical connection. The flanged sleeve 52, of non-conducting material passes through an aperture of a side wall of the cup 20 and insulatingly supports the stud 50, the sleeve portion of the member 52 being of sufficient length to extend beyond the exterior surface of the cup 20, about which is placed an insulating washer 53, a hard metal cup 54, and an insulating washer 55.

Over the stud 50 is then placed a number of shim washers 55a, followed by a nut 56 which is threaded upon the end of the stud 50. This assembly so far completed is then properly positioned and drawn into place by means of a special wrench applied to the nut 56 within the cup 54, so that the nut 56 cooperating with the threaded portion of the stud 50, compresses the elements 52, 53, 54, 55 and 55a, against the strap 35 sufficiently to keep them in tight engagement and in a nonremovable relation.

It will be noticed with reference to Figs. 1 and 3, that the cup member 54 is provided with the axially extending tongue 57 which cooperates with a recess 58 in the wall of the cup 20 to prevent relative rotation between the cup 20 and the cup 54. After the assembly has been completed as described, an insulating washer or shield 59 is forced within the cup 54 and over the extended portion of the stud 50, so as to prevent access to the nut 56 for separation of the parts hereinbefore described. This washer also is to insure insulation of the casing of the coupling unit B, from the terminal stud 50 just described.

It will be noted from the preceding description that a nondemountable electrical connection has been provided between the terminal stud 50 and the circuit breaker contacts 29 and 30, since the contact spring 31 and the connector strap 35 are nonseparably connected as by the screw 34, lock washer 36, and soldered connection 40. This connection is so positioned within the timer housing 20 that it is not readily accessible by the use of ordinary tools for the removal thereof. Further, the connection between the strap 35 and the stud 50 is of such permanent nature that it cannot be readily separated.

The armored cup 54, inclosing the threaded connection of the nut 56 and the stud 50, with the shield 59 prevents the separation of the stud 50 from the housing 20, and further precludes turning of the stud 50 or of the cup 54, which might in some instances aid in separating the parts. The threaded connection between the stud 50 and the nut 56 is so inaccessible as to prevent ready removal of the parts forming connection.

The terminal stud 50 is specially provided for making an interlocking connection with the coupling unit B, which connection is normally nondemountable, or nonmanipulative for separation, except by a predetermined association of the related parts. This interlocking connection is contributed to by the terminal stud 50, by forming the end thereof exterior of the shield washer 59 with a conical like head 60, joined to the main part of the stud 50, by the neck 61 formed by an annular groove 62. The end of the stud 50 thus formed is bifurcated by the slot 63 to provide a guide way and seat for a blade member later to be described. This formation of the stud 50 is well shown in Figs. 1 to 4 inclusive.

The coupling unit B, or ignition lock comprises a hard metal shell 65 of tubular formation, providing a connection with an armored connector D, which will later be described. Within the shell 65 there is provided a metal contact slide 66 of semicylindrical formation as exhibited in Figs. 13 and 14. The contact slide 66 is provided with the parallel flats 67 and 68 which provide means for attaching a nonconducting contact carrier 69, and a grounding contact 70, as by means of a rivet 71 passing therethrough, and through an aperture 72 in the body of the slide 66, between flats 67 and 68.

The slide 66 is further provided with a lateral opening 73 adjoining the aperture 72, which through the office of the passageway 74, that also joins the passage 72 adjacent the aperture 73, provides for connection with a Bowden wire 130. By these provisions, the rivet 71 not only secures the contact carrier 69 and the grounding terminal 70 to the block 66, but also provides means for attaching the Bowden wire 130 of the armored connector B, to the contact slide, in that, when the Bowden wire 130 is inserted in the passage 74 and across the passage 72, the forcing of the rivet 71 through the aperture 72 will bow up the wire 130 and force it into the lateral aperture 73 as illustrated in dotted lines at 130a in Figs. 2 and 4, thus preventing withdrawal of the wire from the slide 66.

As illustrated in the drawings the contact slide 66 operates in the rearward end of the shell 65, and is capable of reciprocable movement along the case, which movement provides means for opening and closing electric circuits through the coupling unit, and for preparing normally passive locking means for conditional operation as will later be explained. In the substantially complementary half of the chamber within the shell 65, as occupied by the contact slide 66, there is provided a normally fixed terminal support 75, of the general formation exhibited in Figs. 15 and 16. The terminal support 75 is formed of nonconducting material and provides the semicylindrical shell portion 76 surmounted by the turret 77. The support moldably secures a connector insert 78 providing a terminal post and support for the switch contact 79. The support also moldably secures an armor plate and a receptor for the terminal screw 80. The terminal support 75 is reduced at the end remote from the turret 77, to the shank portion 81 into which is moldably secured an anchor piece and armor plate 82.

The shell 65 is provided with two apertures 83 and 84, in substantially longitudinal alignment with one another, the aperture 83 conforming to a slot of sufficient size to receive the turret portion 77 of the support 75, and to allow longitudinal movement of the turret within the slot, and consequentally longitudinal movement of the terminal support 75 within the shell 65. Longitudinal movement of the member 75 is normally prevented by means of the stop screw 85, driven through the aperture 84 and threadably received through aligned apertures in the anchor piece 82 and the shank 81.

The parts thus far described are so designed that the turret portion 77 must be moved to the extreme left hand end of the slot 83 in order for the stop screw 85 to be attached, and provides a means contributing to the successful interlocking and nonmanipulative connection of the coupling unit with the ignition element as will later be described.

Within the terminal end of the coupling unit B, and just in front of the terminal support hereinabove described, there is provided a connector lock, which constitutes the remainder of the interlocking mechanism between the ignition element A and the coupling unit B. This connector lock includes a sleeve 90 of nonconducting material, which closely fits within the shell 65 and is permanently fixed thereto by means of the screw pin 91 driven through the wall of the shell and into the sleeve 90. The insulation sleeve 90, is counter bored to provide a central aperture of step cross section as will be seen by reference to Figs. 1, 2, 3 and 4. The main or middle bore provides a receptacle for a compression spring 92, which is disposed about the contact barrel 93, carried by and movable within the main bore of the sleeve 90.

It will be noticed by reference to the drawings that the spring 92 bears at one end against the inwardly directed flange 94 of the sleeve 90, and at the other end against the outwardly directed flange 95 of the barrel 93, and that the diameters of the barrel 93, and of the flange 95, are of sufficient size to be nicely received within the main and reduced bores respectively, of the sleeve 90, permitting a reciprocal movement of the barrel 93 within the sleeve 90 against the pressure of the spring 92. The barrel 90 is provided with an enlargement of the main bore so as to provide a way or receptacle for the locking collars 96 as clearly shown in Figs. 1 to 4 inclusive. The barrel 93 is substantially closed at the end remote from the flange 95, as at 97, except for the somewhat elliptical central aperture 98 for interlockingly receiving the right hand end 99 of a blade 100.

The blade 100 is somewhat elongated, providing at the right hand end a portion 99 having opposite notches, and a dovetail portion 101 at the opposite end, and is secured to the contact barrel 93, by passing the notched portion 99 through the elongated aperture 98 at the end portion 97. The wings 99a of the end portion 99 are then bent out of the plane of the blade, so as to prevent removal of the blade from the contact barrel as will be seen by reference to Figs. 1 and 3. It will be noted from the illustration of the device that the blade 100 is received within the slot or guideway 63 of the stud 50 hereinbefore described, and provides a means for conditioning the coupling unit to be withdrawn or connected to the ignition element as will be apparent from the description that will follow.

The locking collars 96 are urged into locking engagement with the head 60 of the stud 50 by means of the spring ring 102 received within the peripheral groove 103 of the collar 96, as shown in Figs. 1 to 4 and 7 inclusive. Each inner periphery of a collar 96 is provided with a notch, as at 96a, for seating engagement with the dovetail wedge portion 101, as illustrated in Figs. 7, 8 and 9. Means are provided for retaining the locking collars 96 within the enlarged bore of the sleeve 90 by pressing within the outer end of the shell 65, a nonconducting washer 104 which rests against the edge of the barrel 90. Within the extreme end of the shell 65 is threaded a nut or plug 105 having a central aperture of sufficient size to clear the protruding end of the stud 50 and prevent electrical connection therewith.

Means are provided for actuating the blade 100 to retract the locking collars 96 so that the coupling unit may be withdrawn from and attached to the terminal stud 50, and embrace a mechanical connection between the contact barrel 93 and the terminal support 75. It will be noted upon reference to Figs. 1 to 4, 11 and 12 that the contact barrel 93 is provided, in addition to the appointments hereinabove set forth, with a pair of spring tangs 106 and 107, and the contacting leaf 108.

The barrel 93 is provided at the edge of the closed end portion 97 with apertures through which the elements 106, 107 and 108 are inserted. The apertures are large enough to allow the elements 106, 107 and 108 to move slightly along the radial direction of the barrel 93. The ends of the members within the barrel are secured thereto, as by means of spot-welding, and the outwardly extending ends of the tangs 106 and 107 are bent outwardly as at 109, to provide a connection with the terminal support 75. The leaf member 108 is deformed to provide the contact point 110, which, in the assembled relation of the coupling unit is positioned in cooperative relation with the contact blade 79 of the terminal support 75, as illustrated in Fig. 1. The terminal support 75 is provided within the depending flanges of the semicylindrical portion 76 with the depressions 111 for receiving the angular extensions 109 of the spring tangs 106 and 107.

By this structure just described it is possible for one having the proper key for the controller unit, as will appear, to disconnect the coupling unit from the ignition element, and gain access to the parts for servicing or repairs, and is accomplished in the following manner. The switch mechanism being moved to the circuit closed position in which the contact slide 66 is moved toward the right hand end of the shell 65, the stop screw 85 is then removed from the terminal support 75 and the shell 65.

By means of the terminal screw 80 the terminal support 75 can then be moved longitudinally of the shell 65 so far as is permitted by the turret 77 sliding within the aperture 83. This retraction of the terminal support 75, by means of the connection between the support 75 and the spring tangs 106 and 107 will move the contact barrel 93 along the main bore of the shell 90 against the compression of the spring 92. This longitudinal movement of the barrel 93 will carry with it the blade 100, the dove-tail portion 101 contacting the inner surfaces 96a of the collars 96 and camming them to a separated position as illustrated in Figs. 3 and 4, which moves the locking collars 96 to an expanded condition withdrawing them from the annular groove 62 of the stud 50, so that the coupling unit may then be withdrawn from the stud 50 and the cup 54.

To reassemble the switch structure with the ignition element it is necessary to insert the end of the coupling unit within the cup 54, aligning the blade 100 with the slot 63 of the stud 50. The coupling unit is then forced within the cup 54 and over the stud 50, so that the parts may reassume their interlocking relation when the terminal support is returned to its initial position. The conical head 60 of the stud 50 will be received by and readily force apart the locking collars 96 until they pass thereover and drop into the annular groove 62 of the stud 50.

The parts are then in reassembled relation, and electrical connection is automatically made between the terminal screw 80, and the contact breaker mechanism within the ignition element. The union of the ignition element and the coupling unit is substantially non-demountable or non-manipulative, since it is possible to separate or join these units only when the switch mechanism has been manipulated to a predetermined relation. The connection is not easily destroyed, in that all parts are either made of, or protected by a case of, hardened metal which precludes easy rupturing of the connections, or access being had to the interior of the mechanism, except by one possessed of the necessary conditioning means.

The controller unit C, hereinbefore referred to may be any desired form of the push pull type of lock control actuator, but is herein illustrated and described as comprising the shell 120, provided with the longitudinal counter bore 121, which is separated from a coaxial counter bore 122 by a centrally apertured partition 123. Within the bore 122 there is reciprocably retained the lock barrel 124, restrained against longitudinal movement beyond certain limits by the stop pin 125, protruding from the shell 120 into the elongated aperture 126 of the lock barrel 124.

The lock barrel 124 is lockably retained in the desired position by means of a spring pressed bolt 127.

Against the inner end of the lock barrel 124, is placed an actuating disk 128 having an extension 129 to which the Bowden wire 130 is attached. A compression spring 128a is positioned in the bore 122 between the partition 123 and the actuating disk 128 urging the said disk in engagement with the lock barrel, and tending to move the said barrel to the projected position without the shell 120.

About the Bowden wire 130 there is placed a Bowden wire tube 131, one end of which is passed through the central aperture of the partition 123 to the interior of the chamber 122 where the edge of the tube is spun out or turned over, as at 131a, to prevent withdrawal of the tube 131 from the partition 123. A spring wire conduit 133 encircles the tube 131 and is further protected by the armor wire 134 as illustrated in Fig. 1. The armor 134 is of hardened spring material and is attached nondemountably to the sleeve 135 by staking the sleeve at 135a.

The flanged sleeve 135, having its flange 136 received within the first mentioned bore 121 within the shell 120, is swivelly connected thereto by the housing 137, having an inwardly extending flange 137a which engages the sleeve 135 and retains the flanged portion 136 longitudinally movable within the bore 121 of the shell 120. The housing 137 is secured to the shell 120 by means of the screw pin 138, and is further provided with the attaching flange 139 for mounting, as by screws 140, driven through the escutcheon plate 141, the dash or support 142 and threaded into the flange 139.

The armored connector D, in main has been described and likewise its connection with the controller unit C. The other end of the armored connector D is non-demountably connected to the shell 65 by being inserted within the reduced portion 65a, within the end of the tube 131 inserted through a counterbored washer 145, reposing within the case 65. The end of the tube is flared against the bore of the washer as indicated at 146, and the wire 130 is connected to the contact slide 66 as has been earlier described. The reduced portion 65a of the shell 65 is staked against the armored covering 134 as indicated at 147, forming a non-demountable connection between the coupling unit and the armored connector.

In the operation of this device, it is obvious that manipulation of the lock barrel 124 by means of the proper key being inserted therein, that the Bowden wire 130 will be actuated to move the contact slide 66 within the coupling unit B, to open and close the ignition circuit through the terminal 80, and the grounding circuit through the connector 70, and that this mechanism provides a theft proof device for the ignition circuit of an automotive vehicle, since all of the parts are contained within a non-destructible housing of hardened metal. It has already been described how the parts are manipulated to provided for the separation of the coupling unit B, from the ignition element A, and it is clear that a theft preventing device has been provided which is practically insured against tampering and unauthorized use.

While the form of embodiment of the present invention as herein disclosed, constitutes a preferred form, it is to be understood that other forms might be adopted, all coming within the scope of the claims which follow.

What is claimed is as follows:

1. In a theft preventive device of the character described, the combination of locking means, a switch structure comprising a movable switch element, movement of which is adapted to be effected by movement of the said locking means, a connector leading from the said switch structure to an ignition element, one end of said connector having permanent connection with the ignition unit and the other end of said connector being conditionally separable from said switch structure, and means operating upon movement of said locking means into lock position to condition detachment of the said switch structure from the said ignition element.

2. In a device of the character described, the combination of locking means, a switch structure comprising a movable switch element, movement of which is adapted to be effected by movement of the said locking means, an armored connector leading from said switch structure to a controller unit, each end of said connector having a non-demountable connection with the controller unit and the switch structure, said switch structure embodying a locking means for non-demountably connecting the said switch structure and connector unit with an ignition element.

3. In a theft preventing device of the character described, the combination of a switch mechanism, an ignition element provided with a terminal stud, and an armored coupling unit therefor inclosing said switch mechanism, a key actuated controller operatively associated with said switch and a connector having a protecting armor extending between the said switch mechanism and the controller mechanism, one end of the said switch mechanism having detachable connections with the said ignition element, and the opposite end thereof having nondemountable connection with the said connector unit, and means operative upon operation of the said switch mechanism to permit or prevent detachment of said switch mechanism from the said ignition element.

4. An apparatus for locking an ignition element, comprising in combination, a housing, apparatus within the housing having a circuit terminal insulatingly supported by the housing, and providing a terminal stud without the housing, a lock switch for said element with connection to said stud, interlocking devices provided by the terminal stud and the lock switch normally maintaining the switch and ignition element in non-separable relation, and requiring predetermined manipulation of the lock switch before the switch structure can be separated from the terminal stud.

5. In a theft preventive device, the combination comprising, an ignition element provided with an insulated terminal, a lock controlled switch and connector unit having normally nondemountable connections with said terminal stud, a controller unit operatively associated with said switch mechanism, and means for permitting removal of the connector unit from the terminal stud conditional upon a predetermined relation of said switch mechanism.

6. The combination with an electrical unit and circuit controlling means therefor, of a coupling for connecting said unit and means comprising, a switch mechanism, a connector lock device, and armored means enclosing said unit, controlling means, and coupling, said coupling having interlocking provision with said unit and being normally nondemountable therefrom, and means rendering said unit and coupling conditionally separable upon predetermined manipulation of said switch mechanism.

7. In an automotive vehicle, a theft preventing device comprising an attachment for a unit of the electrical apparatus, including an armored flexible conduit carrying at one end a lock, and at the other end a switch, and means within the conduit and adjacent the switch for connecting a terminal thereof with a terminal of the electrical apparatus.

8. A theft preventive device comprising, an insulated terminal provided with an armored covering, an armored circuit controlling mechanism having connection with said terminal, said terminal and mechanism having interlocking provisions which normally prevent separation thereof, and means conditioned upon predetermined manipulation of said circuit controlling mechanism for permitting separation of said terminal and said mechanism.

9. A theft preventing device comprising in combination, an element of an electrical apparatus providing an insulated terminal within an armored covering, an armored circuit controlling mechanism having connection with said terminal, said terminal and mechanism having interlocking provisions which normally prevent separation thereof, and means dependent upon predetermined relation of said circuit controlling mechanism, for separating said mechanism from said terminal.

10. A theft preventing attachment for automotive vehicles, comprising in combination, an ignition element, a circuit terminal stud for said element, an ignition lock and switch having an interlocking engagement with said stud, and normally non-demountable therefrom, and means conditioned upon predetermined manipulation of said switch, to permit releasing of said ignition lock and stud.

11. An ignition lock comprising in combination, a switch mechanism, a terminal connector and lock, lock controlled means for operating the switch mechanism, and armored means enclosing said ignition lock, said connector lock having provisions to non-demountably engage the terminal stud of an electrical apparatus, and conditioned to be removed therefrom only upon certain manipulation of said switch mechanism.

12. An ignition lock comprising in combination, an armored casing, a connector lock within said casing having provision for interlocking connection with the terminal stud of an ignition element, a terminal support relatively fixed to said casing but capable of movement therein, a switch contact provided by said terminal support and a part of said connector lock, a contact slide providing a bridging contact for engagement with said switch contacts, and means for actuating said contact slide and locking it in circuit open position, said connector lock being non-demountable from said terminal stud when the circuit open relation is established.

13. A circuit lock comprising in combination a terminal stud provided by an electrical unit, a switch mechanism having electrical and mechanical connections with said stud, lock controlled means for interrupting the electrical connection, and means for severing the mechanical connection upon predetermined manipulation of said switch mechanism.

14. A circuit lock comprising in combination a terminal stud provided by an electrical unit, a switch mechanism having electrical and mechanical connections with said stud, and normally non-demountable therefrom, means for actuating the switch for interrupting the electrical connection, and for permitting severing of the mechanical connection.

15. A circuit lock comprising in combination a terminal stud provided by an electrical unit, a coupling unit providing interlocking connection with the stud, switch mechanism within said coupling having electrical connection with said stud, and providing a terminal post exterior of said coupling, means for actuating said switch mechanism to open and close a circuit through said post and stud, and means for permitting separation of the stud and coupling upon predetermined manipulation of the switch mechanism.

16. An anti-theft device for automotive vehicle comprising in combination, a circuit breaker mechanism and a housing therefor, a bracket insulatingly mounted within the housing and having electrical connection with said circuit breaker, a terminal stud insulatingly carried by said housing, and a connector link fixed to said stud having electrical connection with said bracket and said circuit breaker, a screw and lock washer forming a common means for connecting the link and circuit breaker to the bracket, said bracket being so positioned within the housing as to render the connection between the link and circuit breaker inaccessible, and the screw and washer rendering the connection thereof substantially non-demountable, and an ignition lock switch mechanism interlockingly connected to said stud.

17. An anti-theft device for automotive vehicles comprising in combination, an electrical unit providing an armored and insulated terminal stud, and an armored ignition lock and controller therefor having an interlocking relation with said stud, said ignition lock including a normally non-manipulative connector lock providing locking collars for engaging a shoulder on said stud, and means insulatingly supporting said collars within the lock armor and providing a support for a lock manipulating assembly.

18. An anti-theft device for automotive vehicles comprising in combination, an electrical unit providing an armored and insulated terminal stud, an armored ignition lock and controller therefor having an interlocking relation with said stud, said ignition lock including a normally non-manipulative connector lock providing locking collars for engaging a shoulder on said stud, means insulatingly supporting said collars within the lock armor and providing a support for a lock manipulating assembly, said assembly including means for separating said locking collars to permit separation of the controller from said unit, and means operable to electrically connect and disconnect said stud and controller while the same are in interlocked relation.

In testimony whereof I hereto affix my signature.

DALPHIN L. HITTLE.